No. 640,031. Patented Dec. 26, 1899.
J. RITCHIE.
CAR BRAKE.
(Application filed Oct. 9, 1899.)
(No Model.)
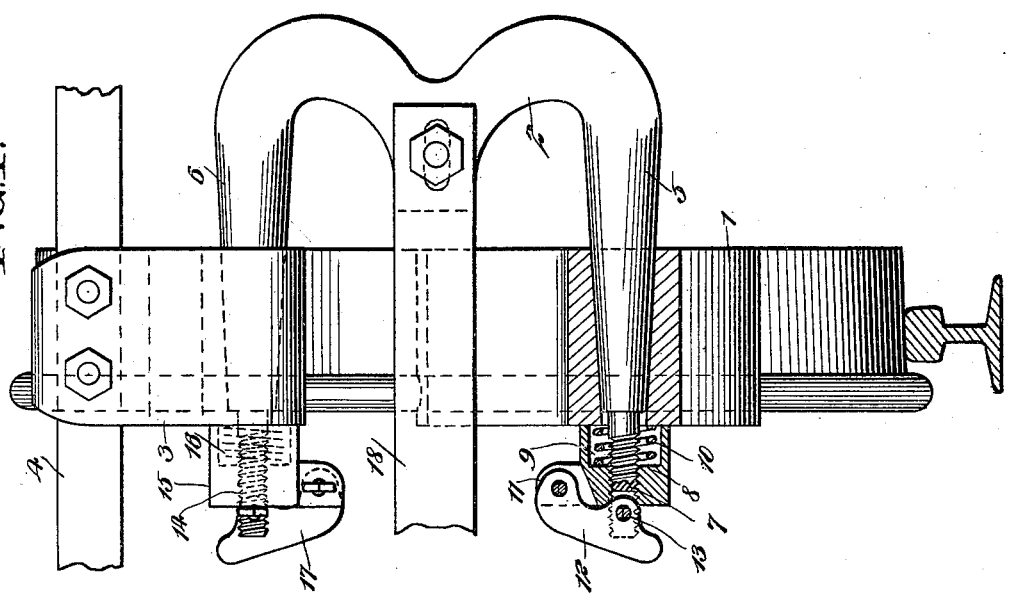
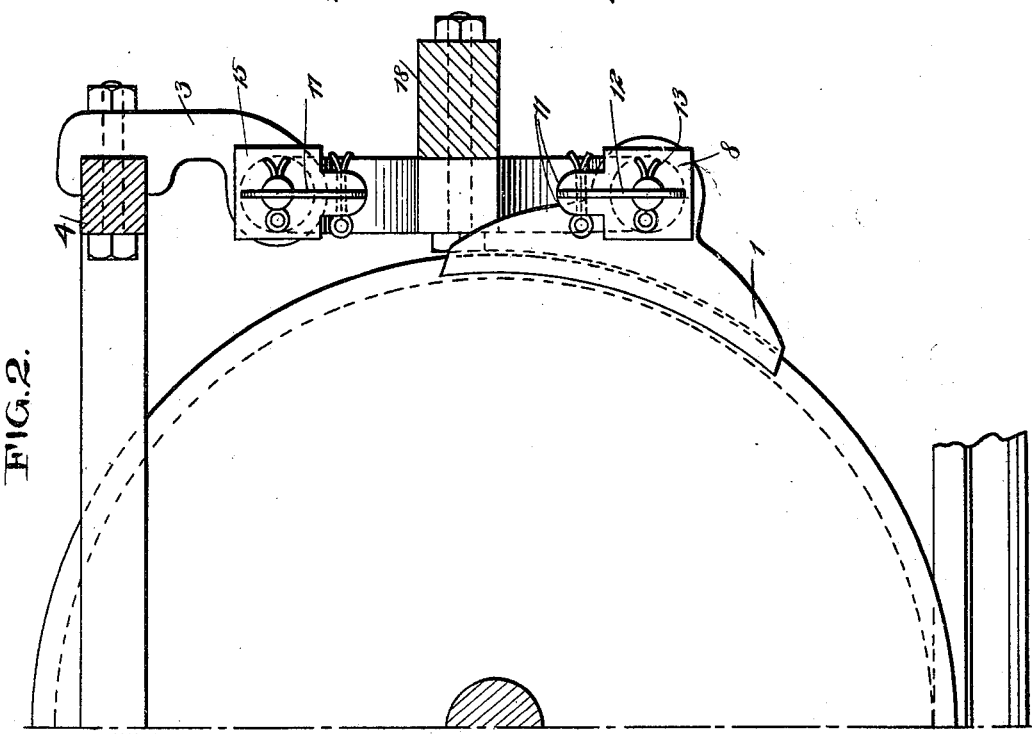
WITNESSES:
INVENTOR
J. Ritchie
ATTORNEYS
THE NORRIS PETERS CO., PHOTO-LITHO., WASHINGTON, D. C.

UNITED STATES PATENT OFFICE.

JAMES RITCHIE, OF NEW YORK, N. Y.

CAR-BRAKE.

SPECIFICATION forming part of Letters Patent No. 640,031, dated December 26, 1899.

Application filed October 9, 1899. Serial No. 733,082. (No model.)

*To all whom it may concern:*

Be it known that I, JAMES RITCHIE, of the city of New York, (Flatbush,) borough of Brooklyn, in the county of Kings and State of New York, have invented a new and Improved Car-Brake, of which the following is a full, clear, and exact description.

This invention relates to improvements in car-brakes; and the object is to provide a brake so constructed that any wear of the bearing between the brake-shoe and the hanger or between the hanger and the hanger-head will be automatically taken up, thus insuring tight or close bearings, so that all noise or rattling incident to the ordinary brakes while setting the same will be done away with; and a further object is to provide a brake-shoe hanger of a form that will give it great strength and durability.

I will describe a car-brake embodying my invention and then point out the novel features in the appended claims.

Reference is to be had to the accompanying drawings, forming a part of this specification, in which similar characters of reference indicate corresponding parts in both the figures.

Figure 1 is a rear elevation, partly in section, of a brake embodying my invention; and Fig. 2 is a side elevation thereof.

Referring to the drawings, 1 designates the brake-shoe, 2 the hanger, and 3 the hanger-head, which is secured to the usual frame 4 of the truck.

The hanger 2 has a longitudinally-tapered journal 5, engaging in a correspondingly-shaped opening in the brake-shoe 1, and it also has a longitudinally-tapered journal 6, having a bearing in a correspondingly-shaped opening in the hanger-head 3. The journals 5 and 6 are connected by a cross-piece, which is curved inward from each journal to the center. This gives considerable strength to the hanger, with a comparatively small amount of metal employed. The journal 5 extends through the bearing or opening in the shoe 1, and it is provided with an extended screw-threaded stem 7, engaged by a nut 8, having a recess 9 in its inner portion, within which is arranged a spring 10. This spring 10 bears at one end against the brake-shoe and at the other end against the end wall of the recess 9. Should any wear occur in the journal 5 or in the bearing through the shoe, the parts will be automatically drawn together by means of the spring 10. Pivotally connected between lugs 11, extended outward from the nut 8, is a locking-plate 12. This locking-plate is designed to be moved into a slot formed in the end of the projection 7, after which a cotter 13 is passed through openings in the side walls of said slotted projection and through an opening in the plate, and thus the nut will be locked in position relatively to the threaded extension 7. The journal 6 is also provided with a threaded extension 14, engaged by a nut 15, within which is a spring 16, which has a tendency to draw the parts together should wear occur, as first described. A nut-locking plate 17 is attached to the nut 15.

It is obvious by the construction shown and described that all wear will be automatically taken up, and thus all noise or rattling will be prevented. The opposite hangers are to be connected by a brake-beam 18 in the usual manner, excepting that the bolts connecting the beam to the hangers pass through slots in the beam, so that there may be a movement of the hangers inward relatively to the beam.

Having thus fully described my invention, I claim as new and desire to secure by Letters Patent—

1. In a brake, a hanger having a longitudinally-tapered journal portion, a brake-shoe having a tapered opening to receive said journal, a nut engaging with the threaded end portion of said journal, the said nut having an interior recess, and a spring in said recess, bearing at one end against the end wall of the recess, substantially as specified.

2. In a car-brake, a fixed hanger-head, a hanger having a longitudinally-tapered journal portion for engaging in a correspondingly-shaped opening in the hanger-head, a nut engaging with an extended threaded portion of said journal, said nut having an interior recess, and a spring in said recess engaging at one end against the hanger-head and at the other end against the end wall of the recess, substantially as specified.

3. In a car-brake, a hanger having longitudinally-tapered journal portions, a hanger-head having an opening longitudinally tapered to receive one of said journal portions, a shoe having a longitudinally-tapered opening to receive the other of said journal portions, and springs for causing the journals to move inward in the openings, substantially as specified.

4. In a car-brake, hanger-heads secured to the truck-frame, brake-shoes, hangers having longitudinally-tapered journal portions to engage in correspondingly-shaped openings in the hanger-heads and also having longitudinally-tapered portions for engaging with correspondingly-shaped openings in the brake-shoes, springs for causing an inward movement of the journals relatively to the parts in which they engage, and a brake-beam connecting opposite hangers, said brake-beam having slots through which the bolts from the hangers extend, substantially as specified.

5. In a car-brake, the combination with a hanger-head and a brake-shoe, of a hanger having tapered journal portions for engaging in the head and shoe, the connection between the journals being curved inward toward the center, forming a substantially E-shaped hanger and a brake-beam having adjustable connection with the inwardly-turned portion, substantially as specified.

JAMES RITCHIE.

Witnesses:
ROBERT H. ANDERSON,
CHARLES BENNETT.